United States Patent
Schwegler et al.

(10) Patent No.: US 11,225,222 B2
(45) Date of Patent: Jan. 18, 2022

(54) VEHICLE ACCESS AND POWER MANAGEMENT SYSTEMS AND METHODS VIA MACHINE LEARNING

(71) Applicant: Continental Automotive Systems Inc., Auburn Hills, MI (US)

(72) Inventors: Jason Brian Schwegler, Grand Blanc, MI (US); Michael Eric Pierfelice, Royal Oak, MI (US); Brian James Marlett, Macomb, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 273 days.

(21) Appl. No.: 16/377,697

(22) Filed: Apr. 8, 2019

(65) Prior Publication Data

US 2020/0198577 A1    Jun. 25, 2020

Related U.S. Application Data (60) Provisional application No. 62/782,457, filed on Dec. 20, 2018.

(51) Int. Cl.
*B60R 25/24* (2013.01)
*G06N 20/00* (2019.01)
*E05B 81/54* (2014.01)
*B60R 25/01* (2013.01)
*B60R 25/40* (2013.01)

(52) U.S. Cl.
CPC ............ *B60R 25/241* (2013.01); *B60R 25/01* (2013.01); *B60R 25/403* (2013.01); *E05B 81/54* (2013.01); *G06N 20/00* (2019.01)

(58) Field of Classification Search
CPC .................................................. B60R 25/241
See application file for complete search history.

(56) References Cited

U.S. PATENT DOCUMENTS

| | | | | |
|---|---|---|---|---|
| 5,969,433 A | * | 10/1999 | Maggiora | B60R 25/04 180/287 |
| 9,986,084 B2 | * | 5/2018 | Abramson | H04W 4/029 |
| 10,147,004 B2 | * | 12/2018 | Atsmon | G06K 9/00832 |
| 10,169,678 B1 | * | 1/2019 | Sachdeva | G05D 1/0221 |
| 10,192,171 B2 | * | 1/2019 | Taylor | G06K 9/00832 |
| 10,193,695 B1 | * | 1/2019 | Endress | G06N 20/00 |
| 10,328,896 B2 | * | 6/2019 | Salter | B60R 25/2009 |
| 10,414,377 B2 | * | 9/2019 | Hoyos | G07C 9/00563 |
| 10,503,990 B2 | * | 12/2019 | Gleeson-May | B60R 25/25 |
| 10,539,660 B2 | * | 1/2020 | Berezin | G01S 13/931 |
| 10,546,441 B2 | * | 1/2020 | Joao | G07C 9/00896 |
| 10,562,492 B2 | * | 2/2020 | Joao | B60R 25/102 |
| 10,745,018 B2 | * | 8/2020 | Abendroth | B60W 40/08 |
| 10,755,083 B2 | * | 8/2020 | Kim | G06K 9/00832 |
| 2015/0298654 A1 | * | 10/2015 | Joao | G01S 19/13 701/2 |
| 2019/0082047 A1 | * | 3/2019 | Abramson | H04M 1/72463 |
| 2019/0220010 A1 | * | 7/2019 | Leonard | B60W 50/14 |
| 2019/0250626 A1 | * | 8/2019 | Ghafarianzadeh | G08G 1/0145 |

* cited by examiner

*Primary Examiner* — Alex C Dunn, PhD (57) ABSTRACT

A method for access to a vehicle includes receiving data from an identification device related to at least one device environment sensor of the identification device. At least one pattern associated with the received data is identified. An environment of the identification device based on feedback from the at least one device environment sensor is determined. The environment to the at least one pattern is compared. In response to the comparing step, access to the vehicle is allowed or denied.

17 Claims, 5 Drawing Sheets

VEHICLE ACCESS AND POWER MANAGEMENT SYSTEMS AND METHODS VIA MACHINE LEARNING

CROSS-REFERENCE TO RELATED APPLICATIONS

This application claims priority to U.S. Provisional Application No. 62/782,457, filed Dec. 20, 2018.

BACKGROUND

This disclosure is directed generally to vehicle access systems, and more particularly to vehicle access and power management systems and methods via machine learning.

Vehicles communicate with identification devices through a variety of communication interfaces. Vehicles and identification devices include environment detection sensors.

SUMMARY

A method for access to a vehicle according to an example of this disclosure includes receiving data from an identification device related to at least one device environment sensor of the identification device. At least one pattern associated with the received data is identified. An environment of the identification device based on feedback from the at least one device environment sensor is determined. The environment to the at least one pattern is compared. In response to the comparing step, access to the vehicle is allowed or denied.

In a further example of the foregoing, the method includes, in response to the comparing step, altering a search and listen pattern between the vehicle and the identification device.

In a further example of any of the foregoing, the method includes, in response to the comparing step, changing a power condition of a device of the vehicle.

In a further example of any of the foregoing, the device is a transceiver associated with a communication interface between the vehicle and the identification device.

In a further example of any of the foregoing, changing a power condition includes powering up the device.

In a further example of any of the foregoing, changing a power condition includes powering down the device.

In a further example of any of the foregoing, the method includes receiving data from the vehicle related to at least one vehicle environment sensor of the vehicle, identifying a second pattern associated with the received vehicle environment data, determining a vehicle environment of the vehicle based on feedback from the at least one vehicle environment sensor, and comparing the vehicle environment to the second pattern, and the allowing or denying access step is in response to the comparing the vehicle environment step.

In a further example of any of the foregoing, the identifying the pattern step is performed using machine learning.

In a further example of any of the foregoing, the machine learning utilizes an algorithm and model programmed into an ECU system of the vehicle.

A method for power management of a vehicle according to an example of this disclosure includes receiving data from an identification device related to at least one device environment sensor of the identification device. The method includes identifying at least one pattern associated with the received data. The method includes determining an environment of the identification device based on feedback from the at least one device environment sensor. The method includes, comparing the environment to the at least one pattern. The method includes, in response to the comparing, changing a power condition of a device of the vehicle.

In a further example of the foregoing, the device is a transceiver associated with a communication interface between the vehicle and the identification device.

In a further example of any of the foregoing, the changing a power condition includes powering up the device.

In a further example of any of the foregoing, the changing a power condition includes powering down the device.

In a further example of any of the foregoing, in response to the comparing step, the method includes altering a search and listen pattern between the vehicle and the identification device.

In a further example of any of the foregoing, the method includes identifying that the identification device is stationary and charging and reducing a frequency of a search and listen pattern between the vehicle and the identification device.

A power management and access system for a vehicle according to an example of this disclosure includes an ECU system. At least one lock is in communication with the ECU system. One or more devices is in communication with the ECU system. The ECU system is configured to utilize machine learning to receive data from an identification device related to at least one device environment sensor of the identification device, identify at least one pattern associated with the received data, determine an environment of the identification device based on feedback from the at least one device environment sensor, compare the environment to the at least one pattern, and, in response to the comparison, send a signal to control the at least one lock to allow or deny access to the vehicle.

In a further example of the foregoing, the ECU system is configured to change a power condition of the one or more devices in response to the comparison.

In a further example of any of the foregoing, the ECU system is configured to alter a search and listen pattern between the vehicle and the identification device in response to the comparison.

These and other features may be best understood from the following specification and drawings, the following of which is a brief description.

DETAILED DESCRIPTION

Figure 1:
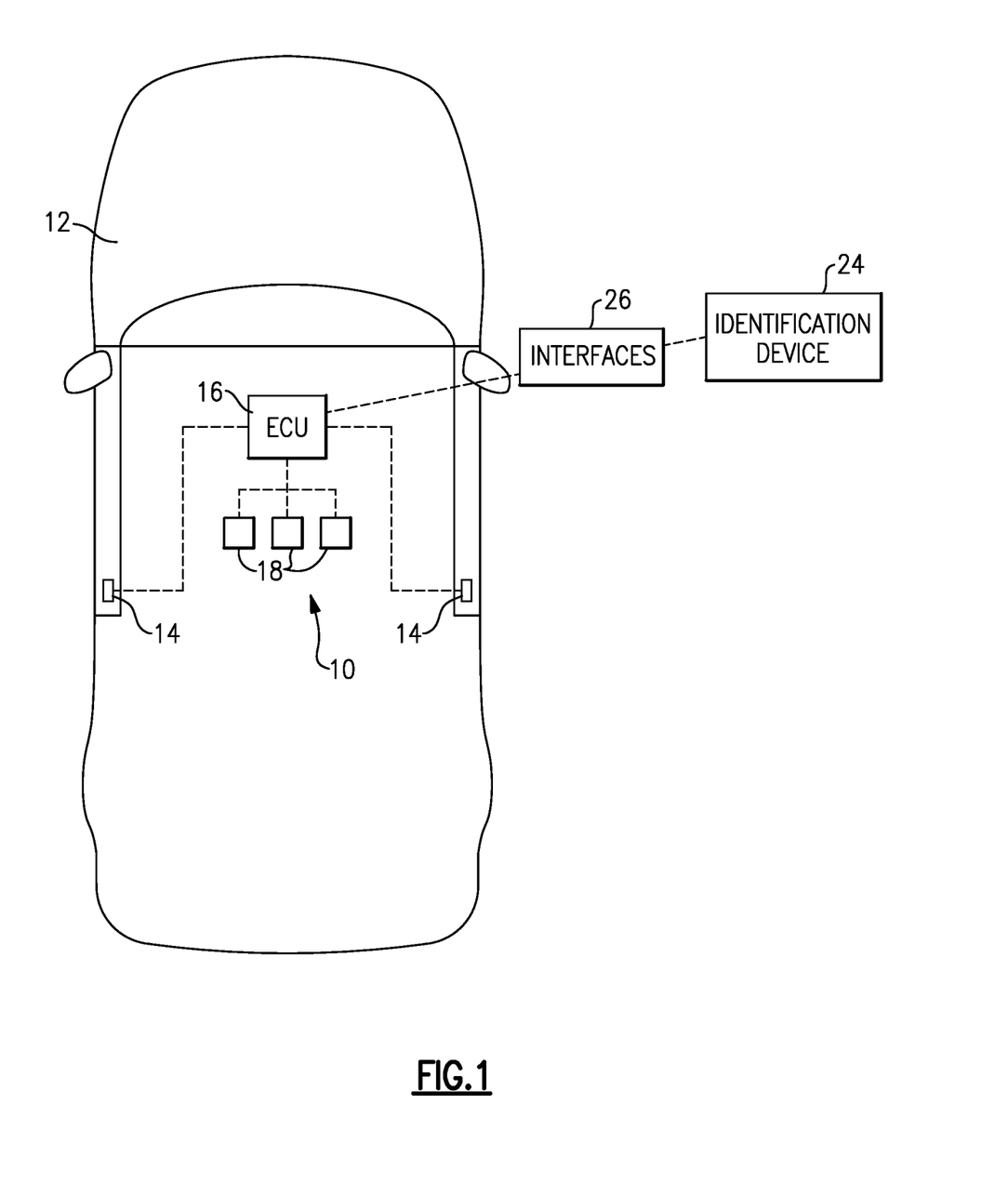
FIG. 1 schematically illustrates an example vehicle access system.

FIG. 1 schematically illustrates an example vehicle access and power management system 10 in a vehicle 12. The vehicle 12 may include one or more locks 14, such as door locks in the example shown, operable to engage or disengage to deny or allow access to the vehicle 12. The locks 14 are controllable by control signals from an engine control unit (ECU) system 16. The ECU system 16 may include one or more individual electronic control units that control one or more electronic systems or subsystems within the vehicle 12. In some examples, the ECU system 16 includes a vehicle access rights management electronic control unit. Although two locks 14 are shown in the illustrative example, more or fewer locks 14 may be utilized.

The ECU system 16 communicates with an identification device 24, in some examples to allow or deny access to the vehicle 12, as explained further below. Some example identification devices 24 may include smartphones or other handheld or wearable devices.

In some examples, the ECU system 16 may alternatively or additionally be in communication to change the power condition of devices 18, such as powering up and/or powering down the devices 18, as shown schematically. In some examples, the devices 18 are transceivers associated with interfaces 26 of communication between the ECU system 16 and the identification device 24. The ECU system 16 may change the power condition of a device 18 based on communication with the identification device 24.

The ECU system 16 may include one or more processors that executes, and memory that stores, computer-executable instructions for performing the various methods, functions, protocols, procedures, etc., described herein. The memory may include volatile, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), other variants, combinations thereof, and/or any other type(s) of memory suitable for providing the described functionality and/or storing computer-executable instructions for execution by the processor.

Figure 2:
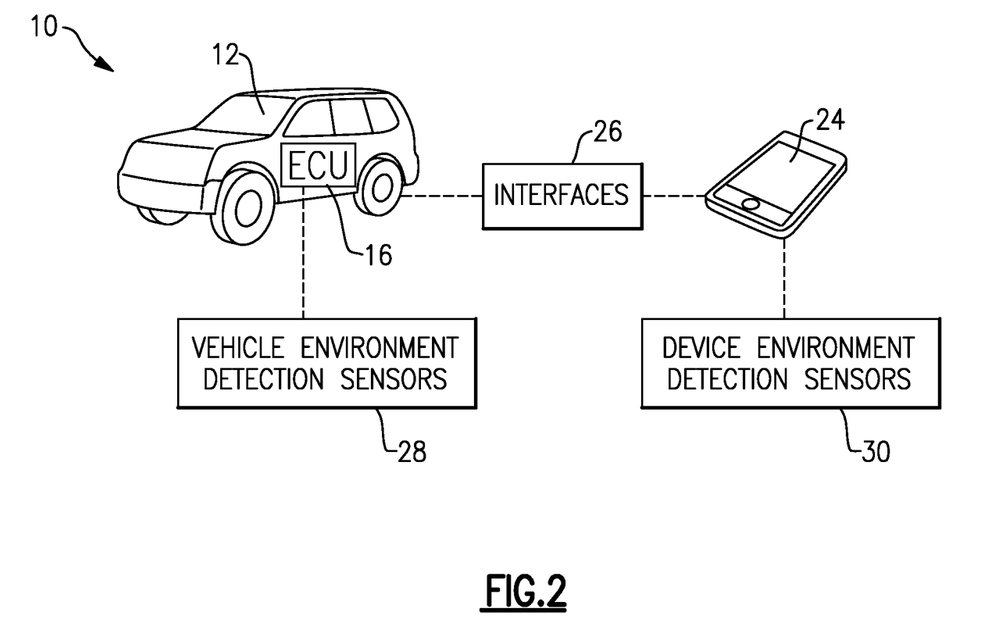
FIG. 2 schematically illustrates communication of the example vehicle access system of FIG. 1.

FIG. 2 schematically illustrates communication between the vehicle 12 and the identification device 24 through one or more interfaces 26. Example interfaces 26 may include one or more of LTE, Wi-Fi, Bluetooth Low Energy (BLE), Near-field communication, Qi, and GPS. The vehicle 12 includes one or more vehicle environment sensors 28. The identification device 24 includes one or more identification device environment sensors 30. The vehicle 12 and the identification device 24 may communicate data based on readings from the sensors 28, 30. In some examples, as shown, the ECU system 16 is in communication with the identification device 24 and the vehicle environment sensors 28. Based on the communications, the ECU system 16 can allow or deny access to the vehicle 12, change a power condition (e.g., power up or power down) of certain functions of the vehicle 12 to conserve power, and/or alter a search and listen pattern, in which the vehicle 12 periodically sends signals to and receives signals from the identification device 24.

Figure 3:
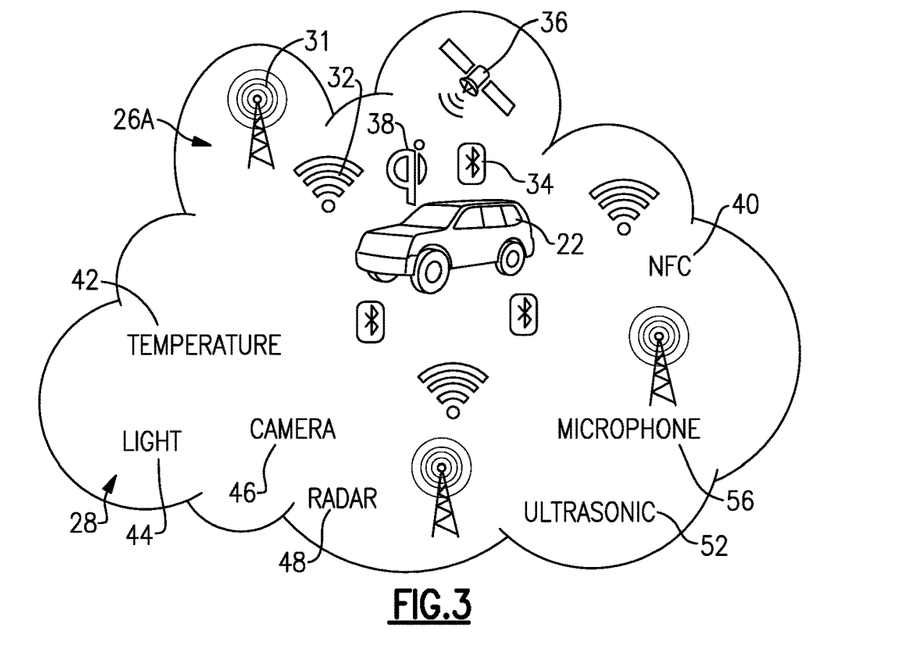
FIG. 3 schematically illustrates example interfaces and environment sensors of a vehicle.

As illustrated in FIG. 3, the interfaces 26A of the vehicle 12 may include LTE 31, Wi-Fi 32, BLE 34, GPS 36, Qi 38, and Near-field communication 40. The vehicle environment sensors 28 may include one or more of a temperature sensor 42, a light sensor 44, a camera 46, a radar sensor 48, a microphone 50, and an ultrasonic sensor 52. Other sensors 28 and interfaces 26A may be used in some examples.

Figure 4:
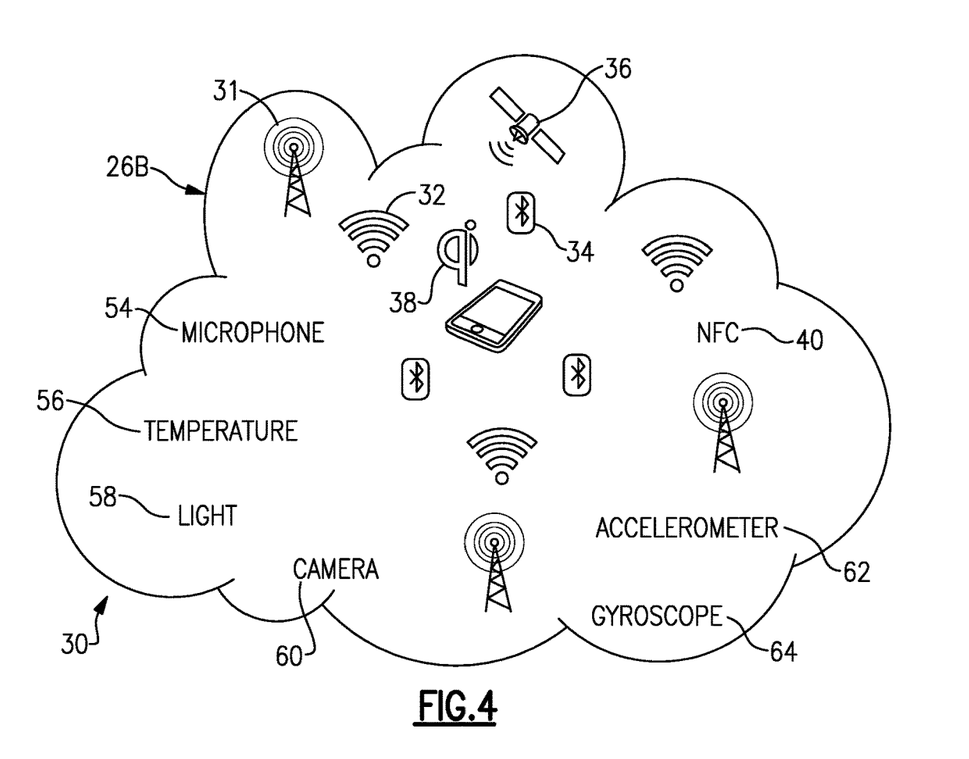
FIG. 4 schematically illustrates example interfaces and environment sensors of an identification device.

As illustrated in FIG. 4, the interfaces 26B of the identification device 24 may include LTE 31, Wi-Fi 32, BLE 34, GPS 36, Qi 38, and Near-field communication 40. The device environment sensors 30 may include one or more of a microphone 54, a temperature sensor 56 a light sensor 58, a camera 60, an accelerometer 62, and a gyroscope 64. Other sensors 30 and interfaces 26B may be used in some examples.

Interface 26 selection and sensor 28, 30 utilization can vary for each environment that the vehicle 12 and identification device 24 are located in. In some examples, information from the sensors 28, 30 can indicate the proximity of the vehicle 12 to the identification device 24. The system 10 analyzes this data to determine whether the vehicle 12 and identification device 24 are in close proximity to one another, which can be used to allow or deny access to the vehicle 12, to change a power condition of certain functions of the vehicle 12 to use less power, and/or to alter a search and listen pattern.

The system 10 utilizes machine learning to learn from data from the sensors 28, 30, identify patterns associated with the data, and make decisions to execute various vehicle 12 functions with minimal human intervention. In some examples, the system 10, such as through the ECU system 16, may use machine learning to understand paths and environment transitions of the identification device 24 after leaving the vehicle 12 and execute various vehicle functions in response. The system 10 may utilize machine learning to receive data from an identification device 24 from one or more of the sensors 30, identify one or more patterns associated with the received data, determine an environment of the identification device 24 based on feedback from the one or more sensors 30, compare the environment to the one or more patterns, and, in response, allow or deny access to the vehicle 12. Alternatively or additionally, in response, the vehicle may change the power condition of a device 18. Alternatively or additionally, in response, the vehicle 12 may alter a search and listen pattern relative to the identification device 24. In some examples, alternatively or additionally, the machine learning may be based on data received from vehicle environment sensors 28.

In some examples, the system 10 may use machine learning based on sensor status, real time changes to vehicle 12 and identification device 24 environments, and historical data to predict proximity of the vehicle 12 and the identification device 24.

In some examples, even when the vehicle 12 and the identification device 24 are in close proximity, the system 10 may know through machine learning that the identification device 24 will not be used to gain access to the vehicle 12 for some time, and may deny access to the vehicle 12, power down devices 18, and/or reduce a polling frequency of a search and listen pattern to conserve power.

Figure 5:
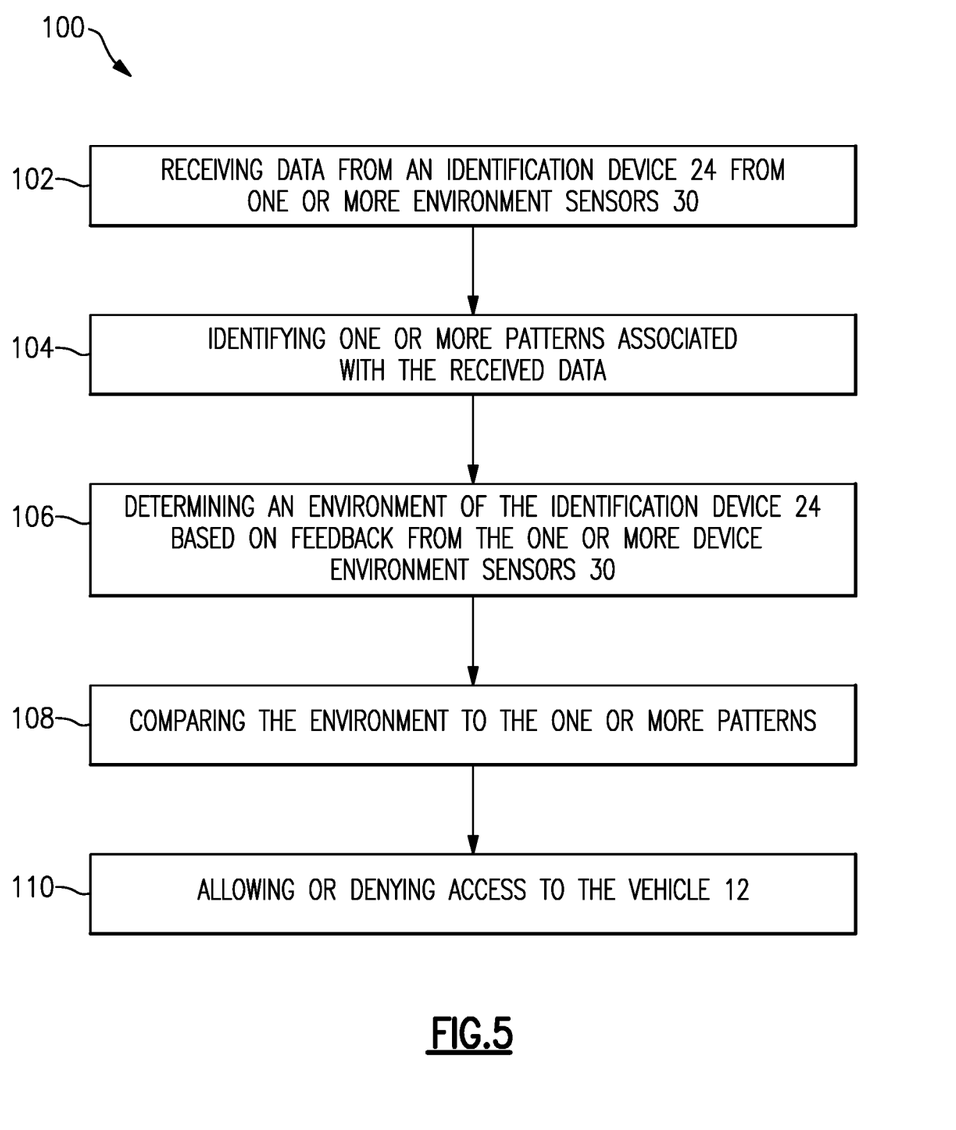
FIG. 5 illustrates a flowchart of an example method for access of a vehicle.

FIG. 5 illustrates a flowchart of an example method 100 for access of a vehicle 12, that may be utilized with the system 10 disclosed. The method 100 includes, at 102, receiving data from an identification device 24 from one or more device environment sensors 30. At 104, the method 100 includes identifying one or more patterns associated with the received data. At 106, the method 100 includes determining an environment of the identification device 24 based on feedback from the one or more device environment sensors 30. At 108, the method 100 includes comparing the environment to the one or more patterns. At 110, the method 100 includes, in response to the step 108, allowing or denying access to the vehicle 12. One or more of the steps of the method 100 be performed utilizing machine learning, such as with the ECU system 16 in some examples.

In some examples, the method 100 includes, in response to step 108, altering a search and listen pattern between the vehicle and the identification device. In some examples, the method 100 includes, in response to step 108, changing a power condition of a device 18.

In some examples, alternatively or additionally, the method 100 may be based on vehicle environment sensor 28 data. The method 100 may include receiving data from the vehicle 12 related to one or more vehicle environment sensors 28 of the vehicle 12, identifying a second pattern associated with the received vehicle environment data, determining a vehicle environment of the vehicle 12 based on feedback from the one or more vehicle environment sensors, and comparing the vehicle environment to the second pattern. The allowing or denying access step may be in response to the comparing the vehicle environment step.

Figure 6:
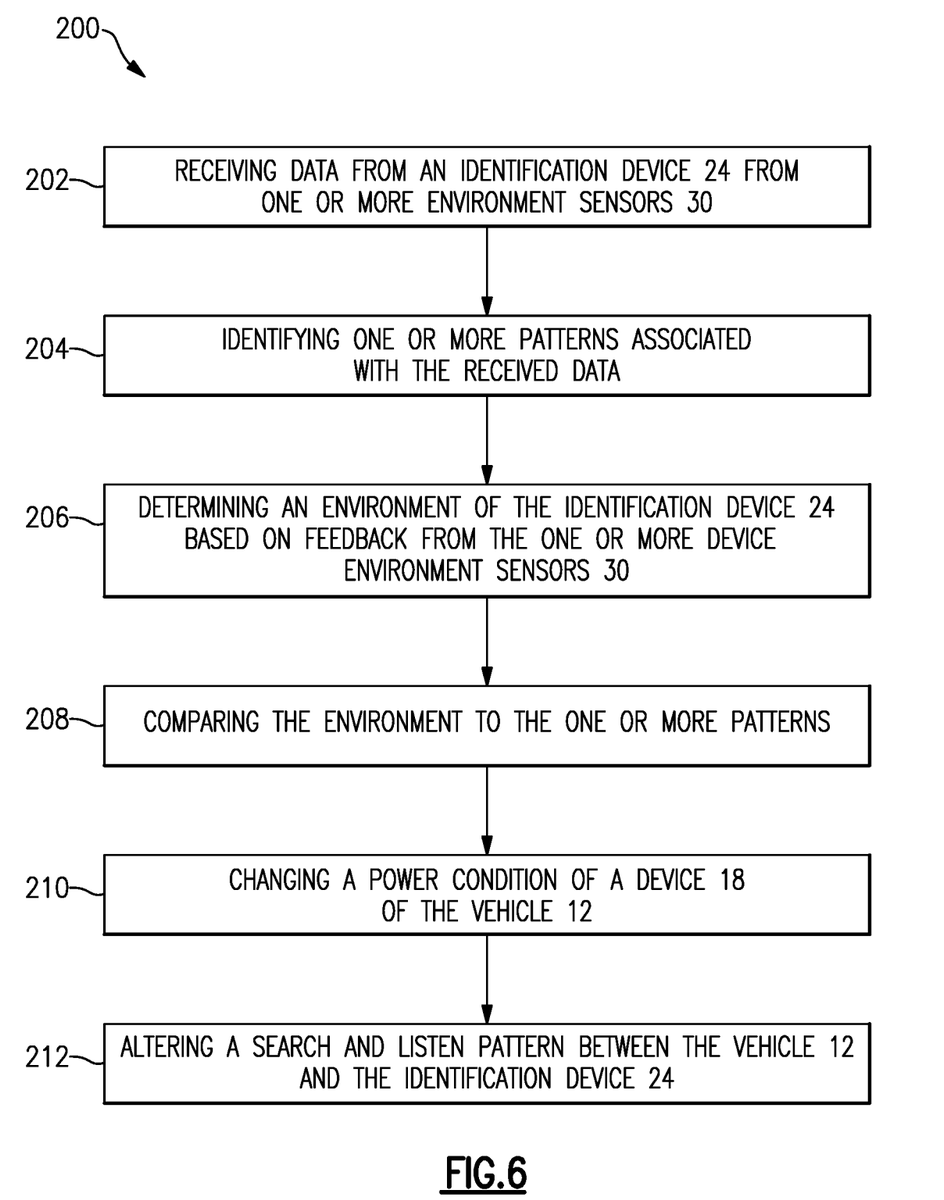
FIG. 6 illustrates a flowchart of an example method for power management of a vehicle.

FIG. 6 illustrates a flowchart of an example method 200 for power management of a vehicle 12, that may be utilized with the system 10 disclosed. The method 200 includes, at 202, receiving data from an identification device 24 from one or more device environment sensors 30. At 204, the method 200 includes identifying one or more patterns associated with the received data. At 206, the method 200 includes determining an environment of the identification device 24 based on feedback from the one or more device environment sensors 30. At 208, the method 200 includes comparing the environment to the one or more patterns. At 210, the method 200 includes, in response to the step 208, changing a power condition of a device 18 of the vehicle 12. Alternatively or additionally, the method 200 includes, at 212, in response to 208, altering a search and listen pattern between the vehicle 12 and the identification device 24.

Steps from the method 100 and the method 200 may be combined in some examples.

In some examples, in a home situation while the users are sleeping, the identification device 24 may be within close proximity to the vehicle 12. However, the system 10 may utilize machine learning to understand that the identification device 24 should not be expected to be used to gain access to the vehicle 12 soon. In some examples, the system may learn this from a detection that the identification device 24 is stationary and/or a detection that the identification device 24 is charging. For example, instead of keeping the search strategy in a quick response mode, if the identification device 24 is not moving or sitting on a wireless charging pad, based on feedback from various device environment sensors 30, then the vehicle 12 can switch into a longer search and listen pattern until the identification device 24 notifies the vehicle 12 of a status or environment change. In some examples, the system 10 may consider the time of day when the identification device 24 would normally start to be utilized.

In some examples, temperature sensors 42, 56 and light sensors 44, 58 on the identification device 24 and the vehicle 12 can be compared for alignment to see if both vehicle 12 and device 24 are in the same environment, such as an indoor or outdoor environment. When used in combination, the light sensor 58 can gate the temperature sensor 56 to know if the device is in pocket, bag, or out in the open.

In some examples, microphones 50, 54 can monitor the level of noise in the background, which can be used to compare the noise environment of the vehicle 12 to the noise environment to the identification device 24.

In some examples, one or more of accelerometer 62, compass & gyroscope 64 data can be used to track how the identification device 24 moved toward and/or away from the vehicle 12. These sensors used to classify walking, running, standing, etc.

In some examples, on the vehicle 12 side, radars and ultrasonic tracking can monitor the path of motion of the user and compare this with the identification device 24 path determination.

In an example in which a user walks from a vehicle 12 that is parked, the vehicle 12 can use its sensors 28, such as Advanced Driver Assist Sensors like cameras, RADAR, and LiDAR, to observe the trajectory the user takes take when leaving the vehicle 12. With repeated visits to the same location, which may be sensed with GPS in some examples, the vehicle 12 can begin to predict the departure path, time to return, and approach path of the authorized user. The identification device 24 may also have sensors 30 tracking the path as the identification device 24 leaves the vehicle 12. The identification device 24 can then collect the sensor 30 data over repeated visits to predict which sensor inputs are principle components to an algorithm that reliably classifies segments of the path and which of those segments can be used in an algorithm to predict a trajectory of the identification device 24, such as when the user will return to the vehicle 12.

In some examples, the pairings of the observed trajectory from the vehicle 12 and the sensed trajectory of the device 24 may vary from day to day, such as when the user parks in various nearby locations and enters or exits through a variety of access points of their destination. The identification device 24 shares its prediction of when and how it expects the user to be on his or her way to return to the vehicle 12. This sharing may be accomplished via indirect or direct means, depending on the proximity of the identification device 24 and the vehicle 12. Once the vehicle 12 has a high confidence input from the identification device 24 on a returning trajectory of the user, it can use its relevant sensors 28 and devices 18, such as wireless receivers, to confirm the approach of the user and the identification device 24.

The path segment classification may occur locally on the identification device 24, on an algorithm on the vehicle 12, or on a cloud service that incorporates data from many users and vehicles to continually tune a generic algorithm. In the cloud shared example, algorithm tuning benefits from large anonymous populations of users with highly correlated data for a given location. A set of algorithms may be highly optimized for the identification devices 24 and vehicles 12 parked in large common locations and are available to be exchanged with the vehicle 12 and the identification devices 24 in those areas. Blended approaches may also be achieved where locations are classified as public or private. In some examples, users may hold their path data and associated approach algorithms within their devices 24 and vehicles 12 for private locations and share those where they can benefit from and contribute to the crowdsourced solutions.

In some examples, the system 10 may prioritize among multiple authorized users. In an example in which multiple users are authorized to access a vehicle 12, the vehicle 12 may have a confidence level for each potential user and manage its sensor state according to their proximity For instance, if one user leaves the vehicle 12 in a long term parking situation and uses another form of transportation to move significantly farther away than the other authorized users, then the vehicle 12 prepares for the most relevant case of the nearest authorized user to approach. In some examples, the system 10 may focus on the prioritized user for the search and listen function.

In some examples, in the multiple authorized user scenario for the primary user leaving the vehicle 12 in a long term parking setting, there may be an option to set the remaining users to a confidence threshold below the one determined by their own "on approach" confidence threshold. That is, the system 10 may default to a polling or search strategy that matches with a "closest authorized user" priority; however, the system 10 would have the capability to invert the priority to force the system to set the search strategy to a lower power mode based on the request of the last user who has to return to the vehicle 12 on a very specific path which takes more time into consideration. Based on the changing schedules, the priority may be restored on request. This will have the effect of enabling a much lower power state and reduced availability of the wireless access systems to attack. The other authorized users with sufficient permissions are also able restore their "on approach" confidence threshold as needed.

In some examples, the system 10 may learn that a first authorized user's device 24 is in close proximity to the vehicle 12, and a second authorized user's device 24 is located farther away, such as in another city, state, province, country, etc. In these examples, the vehicle 12 may choose not to react to the second authorized user's device 24.

Vehicles 12 and identification devices 24 can further enhance the proximity detection through their ability to recognize changes in their environments to determine if the search and listen functions of the access system should be available and authorize actions. This could be any combination of wireless interface measurements or environment detection sensors available to the vehicle and the smart device.

The system 10 can adapt the search and listen management to the environmental state, changes through that environment, user behaviors on the path through the environment, and historical data on paths through the environment.

The systems and methods disclosed provide enhanced access, security, and power management through the use of machine learning.

Although the different examples are illustrated as having specific components, the examples of this disclosure are not limited to those particular combinations. It is possible to use some of the components or features from any of the examples in combination with features or components from any of the other examples.

A worker of ordinary skill in the art would understand that certain modifications could come within the scope of this disclosure.

What is claimed is:

1. A method for access to a vehicle, the method comprising:
   receiving data from an identification device related to at least one device environment sensor of the identification device;
   identifying at least one pattern associated with the received data;
   determining an environment of the identification device based on feedback from the at least one device environment sensor;
   comparing the environment to the at least one pattern; and
   in response to the comparing step, allowing or denying access to the vehicle;
   identifying that the identification device is stationary and charging; and
   reducing a frequency of a search and listen pattern between the vehicle and the identification device.

2. The method as recited in claim 1, the method comprising:
   in response to the comparing step, altering a search and listen pattern between the vehicle and the identification device.

3. The method as recited in claim 1, the method comprising:
   in response to the comparing step, changing a power condition of a device of the vehicle.

4. The method as recited in claim 3, wherein the device is a transceiver associated with a communication interface between the vehicle and the identification device.

5. The method as recited in claim 3, wherein the changing a power condition includes powering up the device.

6. The method as recited in claim 3, wherein the changing a power condition includes powering down the device.

7. The method as recited in claim 1, the method comprising:
   receiving data from the vehicle related to at least one vehicle environment sensor of the vehicle;
   identifying a second pattern associated with the received vehicle environment data;
   determining a vehicle environment of the vehicle based on feedback from the at least one vehicle environment sensor; and
   comparing the vehicle environment to the second pattern, wherein the allowing or denying access step is in response to the comparing the vehicle environment step.

8. The method as recited in claim 1, wherein the identifying the pattern step is performed using machine learning.

9. The method as recited in claim 8, wherein the machine learning utilizes an algorithm and model programmed into an ECU system of the vehicle.

10. A method for power management of a vehicle, the method comprising:
    receiving data from an identification device related to at least one device environment sensor of the identification device;
    identifying at least one pattern associated with the received data;
    determining an environment of the identification device based on feedback from the at least one device environment sensor;
    comparing the environment to the at least one pattern; and
    in response to the comparing step, changing a power condition of a device of the vehicle;
    identifying that the identification device is stationary and charging; and
    reducing a frequency of a search and listen pattern between the vehicle and the identification device.

11. The method as recited in claim 10, wherein the device is a transceiver associated with a communication interface between the vehicle and the identification device.

12. The method as recited in claim 10, wherein the changing a power condition includes powering up the device.

13. The method as recited in claim 10, wherein the changing a power condition includes powering down the device.

14. The method as recited in claim 10, the method comprising:
    in response to the comparing step, altering a search and listen pattern between the vehicle and the identification device.

15. A power management and access system for a vehicle, comprising:
    an ECU system;

at least one lock in communication with the ECU system; and one or more devices in communication with the ECU system, wherein the ECU system is configured to utilize machine learning to receive data from an identification device related to at least one device environment sensor of the identification device, identify at least one pattern associated with the received data, determine an environment of the identification device based on feedback from the at least one device environment sensor, compare the environment to the at least one pattern, in response to the comparison, send a signal to control the at least one lock to allow or deny access to the vehicle, identify that the identification device is stationary and charging, and reduce a frequency of a search and listen pattern between the vehicle and the identification device.

16. The power management system as recited in claim 15, wherein the ECU system is configured to change a power condition of the one or more devices in response to the comparison.

17. The power management system as recited in claim 15, wherein the ECU system is configured to alter a search and listen pattern between the vehicle and the identification device in response to the comparison.

* * * * *